(12) United States Patent
Ye

(10) Patent No.: US 10,054,827 B2
(45) Date of Patent: Aug. 21, 2018

(54) COA TYPE LIQUID CRYSTAL DISPLAY PANEL

(71) Applicant: Shenzhen China Star Optoelectronics Technology Co., Ltd., Shenzhen (CN)

(72) Inventor: Yanxi Ye, Shenzhen (CN)

(73) Assignee: SHENZHEN CHINA STAR OPTOELECTRONICS TECHNOLOGY CO., LTD., Shenzhen, Guangdong (CN)

( * ) Notice: Subject to any disclaimer, the term of this patent is extended or adjusted under 35 U.S.C. 154(b) by 163 days.

(21) Appl. No.: 14/786,164

(22) PCT Filed: Oct. 13, 2015

(86) PCT No.: PCT/CN2015/091801
§ 371 (c)(1),
(2) Date: Oct. 22, 2015

(87) PCT Pub. No.: WO2017/031815
PCT Pub. Date: Mar. 2, 2017

(65) Prior Publication Data
US 2017/0153509 A1 Jun. 1, 2017

(51) Int. Cl.
*G02F 1/1343* (2006.01)
*G02F 1/1335* (2006.01)
*G02F 1/1337* (2006.01)
*G02F 1/1333* (2006.01)
*G02F 1/1362* (2006.01)

(52) U.S. Cl.
CPC .. *G02F 1/134309* (2013.01); *G02F 1/133345* (2013.01); *G02F 1/133512* (2013.01); *G02F 1/136213* (2013.01); *G02F 1/133371* (2013.01); *G02F 1/133707* (2013.01); *G02F 2001/133302* (2013.01); *G02F 2001/136218* (2013.01); *G02F 2001/136222* (2013.01); *G02F 2201/121* (2013.01); *G02F 2201/123* (2013.01); *G02F 2201/52* (2013.01)

(58) Field of Classification Search
CPC ............................................ G02F 2001/136222
USPC .......................................................... 349/107
See application file for complete search history.

(56) References Cited

U.S. PATENT DOCUMENTS

| | | | | |
|---|---|---|---|---|
| 2011/0001911 A1* | 1/2011 | Shirai | ..................... | G02B 5/201 349/106 |
| 2011/0149183 A1* | 6/2011 | Cho | ................... | G02F 1/133514 349/38 |
| 2012/0133872 A1* | 5/2012 | Kim | ................... | G02F 1/133707 349/128 |

FOREIGN PATENT DOCUMENTS

| CN | 101304034 A | 11/2008 |
|---|---|---|
| CN | 101452162 A | 6/2009 |
| CN | 101762919 A | 6/2010 |

* cited by examiner

Primary Examiner — Wen-Ying P Chen
(74) Attorney, Agent, or Firm — Leong C. Lei

(57) ABSTRACT

The present invention provides a COA type liquid crystal display panel. In each pixel unit of the lower substrate, borders of the color resist layer in respective directions are all located at inner sides of the frame electrode and the common electrode line, then no color resist layer is arranged between the frame electrode and the common electrode line to reduce a vertical distance between the frame electrode and the common electrode line and provide a larger storage capacitor. Accordingly, the display quality of the COA type liquid crystal display panel is promoted.

10 Claims, 4 Drawing Sheets

COA TYPE LIQUID CRYSTAL DISPLAY PANEL

FIELD OF THE INVENTION

The present invention relates to a display technology field, and more particularly to a COA type liquid crystal display panel.

BACKGROUND OF THE INVENTION

The Liquid Crystal Display (LCD) possesses advantages of thin body, power saving and no radiation to be widely used in many application scope. It has been widely utilized in, such as mobile phones, PDAs (personal digital assistance), digital cameras, laptop screens or notebook screens.

Generally, the liquid crystal display comprises a shell, a LCD panel located in the shell and a backlight module located in the shell. Particularly, the structure of the liquid crystal panel mainly comprise a TFT Array Substrate (Thin Film Transistor Array Substrate), a CF (Color Filter) and a Liquid Crystal Layer. The working principle is that the light of backlight module is reflected to generate images by applying driving voltages to the two glass substrate for controlling the rotations of the liquid crystal molecules.

The COA (Color-filter on Array) technology is an integration skill of directly manufacturing the color filter on the array substrate. It can effectively solve the issue of light leakage caused by the misalignment of the liquid crystal display device in the cell process and can significantly raise the display aperture ratio.

Please refer to FIG. 1 and FIG. 2 which shows a COA type liquid crystal display panel according to prior art, comprising a lower substrate 100, an upper substrate 200 oppositely located to the lower substrate 100 and a liquid crystal layer (not shown) located between the lower substrate 100 and the upper substrate 200;

the lower substrate 100 comprises a plurality of pixel units, and the pixel unit comprises a first substrate 110, a common electrode line 120 and a gate scan line 130 located on the first substrate 110, and an insulation layer 140 located on the common electrode line 120 and the gate scan line 130, a color resist layer 150 located on the insulation layer 140, a passivation layer 160 located on the color resist layer 150 and a pixel electrode 170 located on the passivation layer 160;

the pixel electrode 170 comprises a frame electrode 175 located at peripheric edges, and a storage capacitor Cst is formed between the frame electrode 175 and the common electrode line 120 located below correspondingly thereto;

However, in the lower substrate 200 of the COA type liquid crystal display panel according to prior art, the color resist layer 150 continues to extend to the outer sides of the frame electrode 175, and is located between the frame electrode 175 and the common electrode line 120. Thus, the distance between the frame electrode 175 and the common electrode line 120 is increased. According to the capacitance calculation formula C=εS/d of parallel-plate capacitor (wherein ε is the dielectric constant of the medium between plates, and S is the plate area, and d is a distance between plates), the size of the capacitor is inversely proportional to the distance between the two plates of the capacitor. Therefore, the existence of the color resist layer 150 makes the distance between the frame electrode 175 and the common electrode line 120 become larger. Namely the distance between the two plates of the storage capacitor Cst is increased and the storage capacitor Cst is decreased. The requirement to the leak current in the display period cannot be satisfied, and the stability of display is reduced.

SUMMARY OF THE INVENTION

An objective of the present invention is to provide a COA type liquid crystal display panel, of which the distance between the pixel electrode and the common electrode by reducing the dimension of the color resist layer in the pixel unit. Accordingly, the capacitance of the storage capacitor is raised to promote the display quality of the liquid crystal display panel.

For realizing the aforesaid objective, the present invention provides a COA type liquid crystal display panel, comprising a lower substrate, an upper substrate oppositely located to the lower substrate and a liquid crystal layer located between the lower substrate and the upper substrate;

the lower substrate comprises a plurality of pixel units, and the pixel unit comprises a first substrate, a common electrode line and a gate scan line located on the first substrate, and an insulation layer located on the common electrode line and the gate scan line, a color resist layer located on the insulation layer, a passivation layer located on the color resist layer and a pixel electrode located on the passivation layer;

the pixel electrode comprises a frame electrode located at peripheric edges of the pixel units, and a storage capacitor is formed between the frame electrode and the common electrode line located below correspondingly thereto;

borders of the color resist layer in respective directions are all located at inner sides of the frame electrode and the common electrode line, then no color resist layer is arranged between the frame electrode and the common electrode line to reduce a vertical distance between the frame electrode and the common electrode line and provide the larger storage capacitor.

The upper substrate comprises a second substrate, a black matrix located on the second substrate, a common electrode located on the black matrix, and the black matrix covers an edge region and of each pixel unit and spaced areas among adjacent pixel units on the lower substrate.

The borders of the color resist layer and borders of the black matrix are aligned.

The pixel electrode further comprises a main electrode inside the frame electrode and connecting thereto, and a plurality of branch electrodes connected between the main electrode and the frame electrode.

The frame electrode is rectangular, and the main electrode is a cross.

Both the first substrate and the second substrate are glass substrates.

The lower substrate comprises red, green blue pixel units, and materials of color resist layer respectively are red, green, blue resists corresponding to the red, green blue pixel units.

The insulation layer and the passivation layer are a silicon nitride layer, a silicon oxide layer or a compound layer consisted of the silicon nitride layer and the silicon oxide layer.

The present invention further provides a COA type liquid crystal display panel, comprising a lower substrate, an upper substrate oppositely located to the lower substrate and a liquid crystal layer located between the lower substrate and the upper substrate;

the lower substrate comprises a plurality of pixel units, and the pixel unit comprises a first substrate, a common electrode line and a gate scan line located on the first substrate, and an insulation layer located on the common electrode line and the gate scan line, a color resist layer located on the insulation layer, a passivation layer located on the color resist layer and a pixel electrode located on the passivation layer;

the pixel electrode comprises a frame electrode located at peripheric edges of the pixel units, and a storage capacitor is formed between the frame electrode and the common electrode line located below correspondingly thereto;

borders of the color resist layer in respective directions are all located at inner sides of the frame electrode and the common electrode line, then no color resist layer is arranged between the frame electrode and the common electrode line to reduce a vertical distance between the frame electrode and the common electrode line and provide the larger storage capacitor;

wherein the upper substrate comprises a second substrate, a black matrix located on the second substrate, a common electrode located on the black matrix, and the black matrix covers an edge region and of each pixel unit and spaced areas among adjacent pixel units on the lower substrate;

the pixel electrode further comprises a main electrode inside the frame electrode and connecting thereto, and a plurality of branch electrodes connected between the main electrode and the frame electrode;

wherein the lower substrate comprises red, green blue pixel units, and materials of color resist layer respectively are red, green, blue resists corresponding to the red, green blue pixel units;

The benefits of the present invention are: the present invention provides a COA type liquid crystal display panel. In each pixel unit of the lower substrate, borders of the color resist layer in respective directions are all located at inner sides of the frame electrode and the common electrode line, then no color resist layer is arranged between the frame electrode and the common electrode line to reduce a vertical distance between the frame electrode and the common electrode line and provide a larger storage capacitor. Accordingly, the display quality of the COA type liquid crystal display panel is promoted.

In order to better understand the characteristics and technical aspect of the invention, please refer to the following detailed description of the present invention is concerned with the diagrams, however, provide reference to the accompanying drawings and description only and is not intended to be limiting of the invention.

BRIEF DESCRIPTION OF THE DRAWINGS

The technical solution and the beneficial effects of the present invention are best understood from the following detailed description with reference to the accompanying figures and embodiments.

In drawings.

DETAILED DESCRIPTION OF PREFERRED EMBODIMENTS

For better explaining the technical solution and the effect of the present invention, the present invention will be further described in detail with the accompanying drawings and the specific embodiments.

Figure 1:
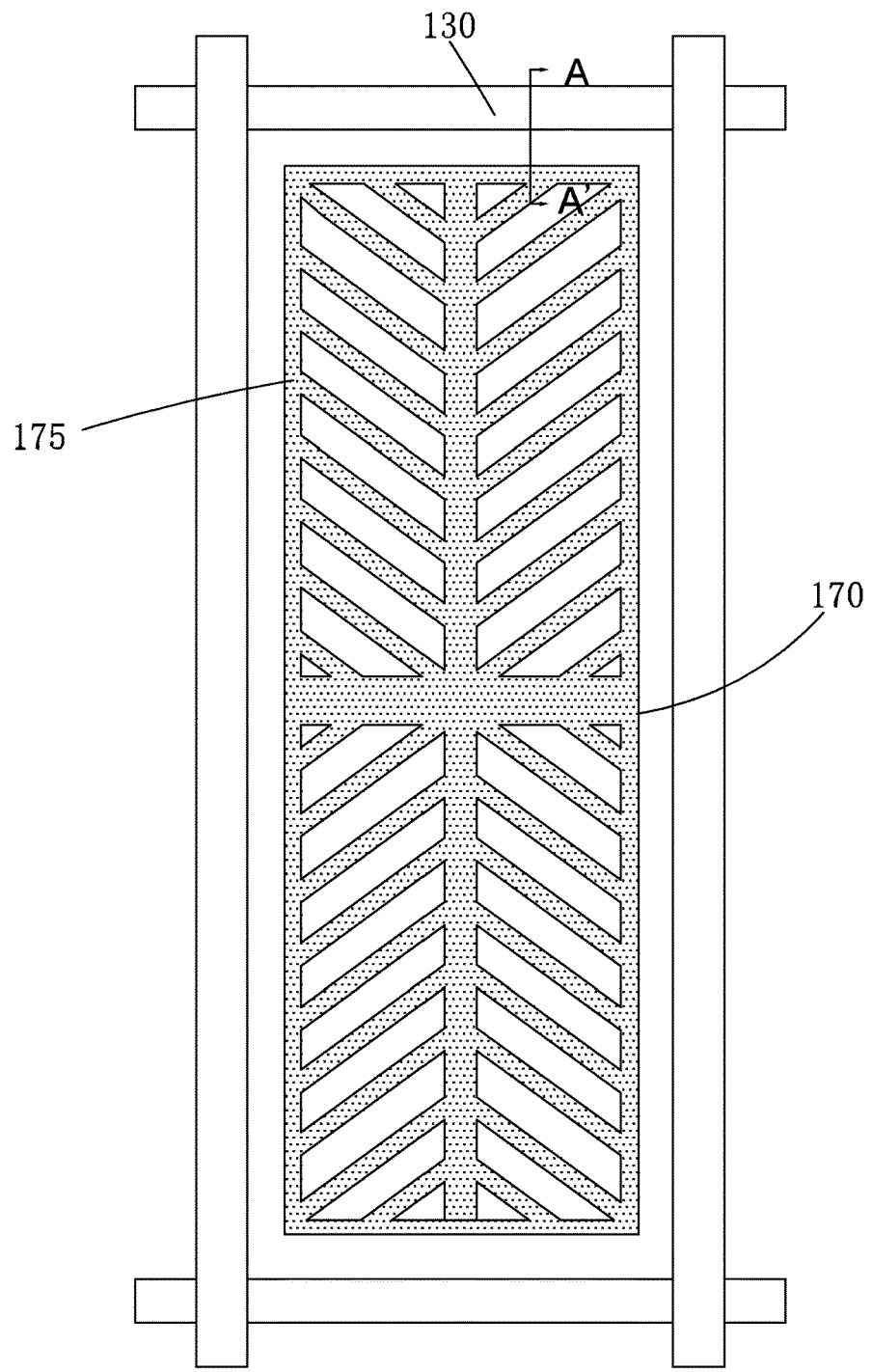
FIG. 1 is a structural diagram of a pixel unit of a lower substrate of a COA type liquid crystal display panel according to prior art.
Figure 2:
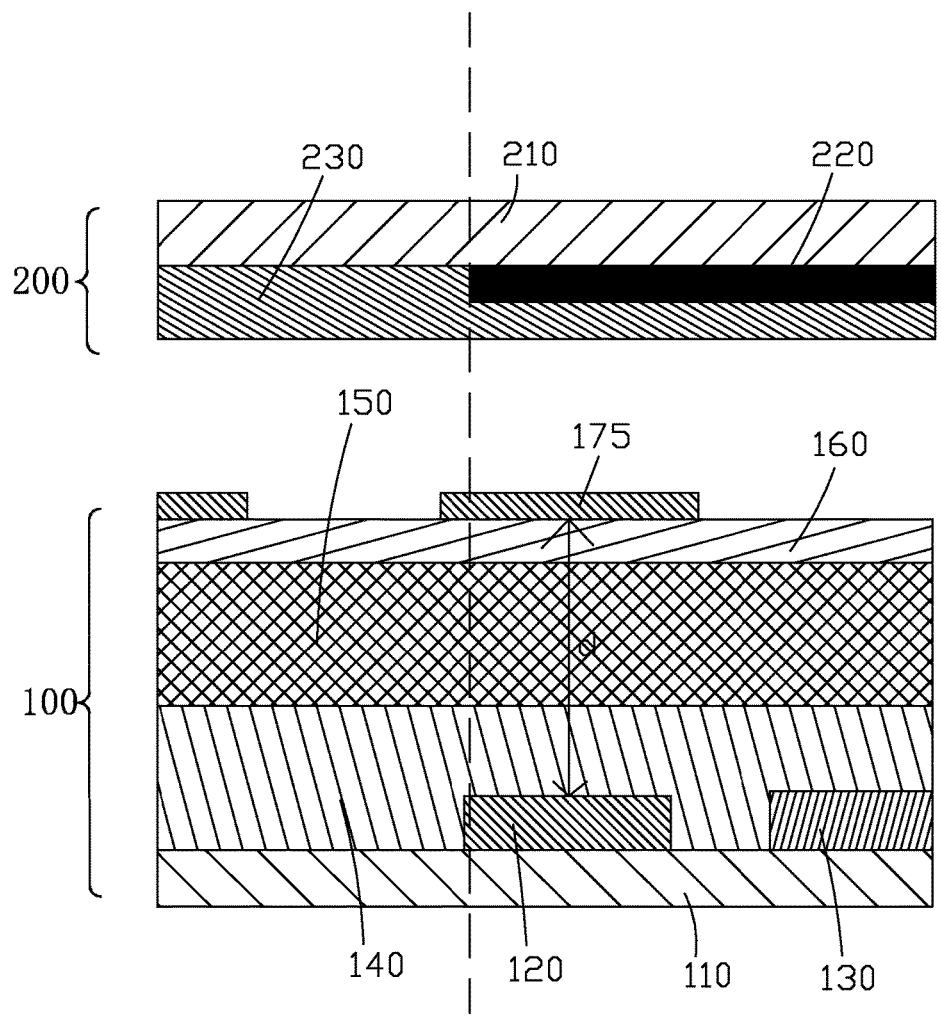
FIG. 2 is a sectional diagram along a sectional line A-A' in FIG. 1 according to a COA type liquid crystal display panel according to prior art.
Figure 3:
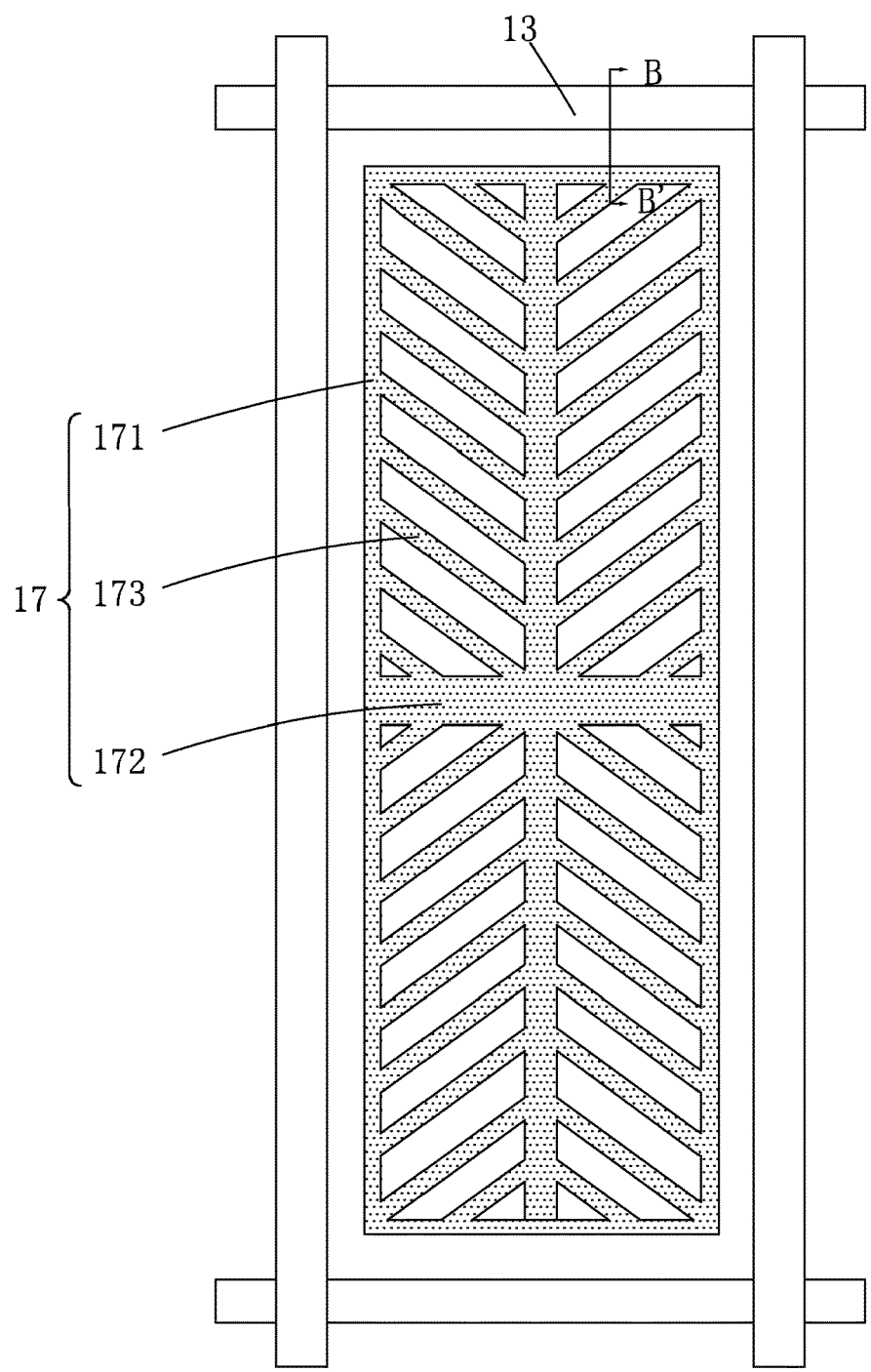
FIG. 3 is a structural diagram of a pixel unit of a lower substrate of a COA type liquid crystal display panel according to the present invention.
Figure 4:
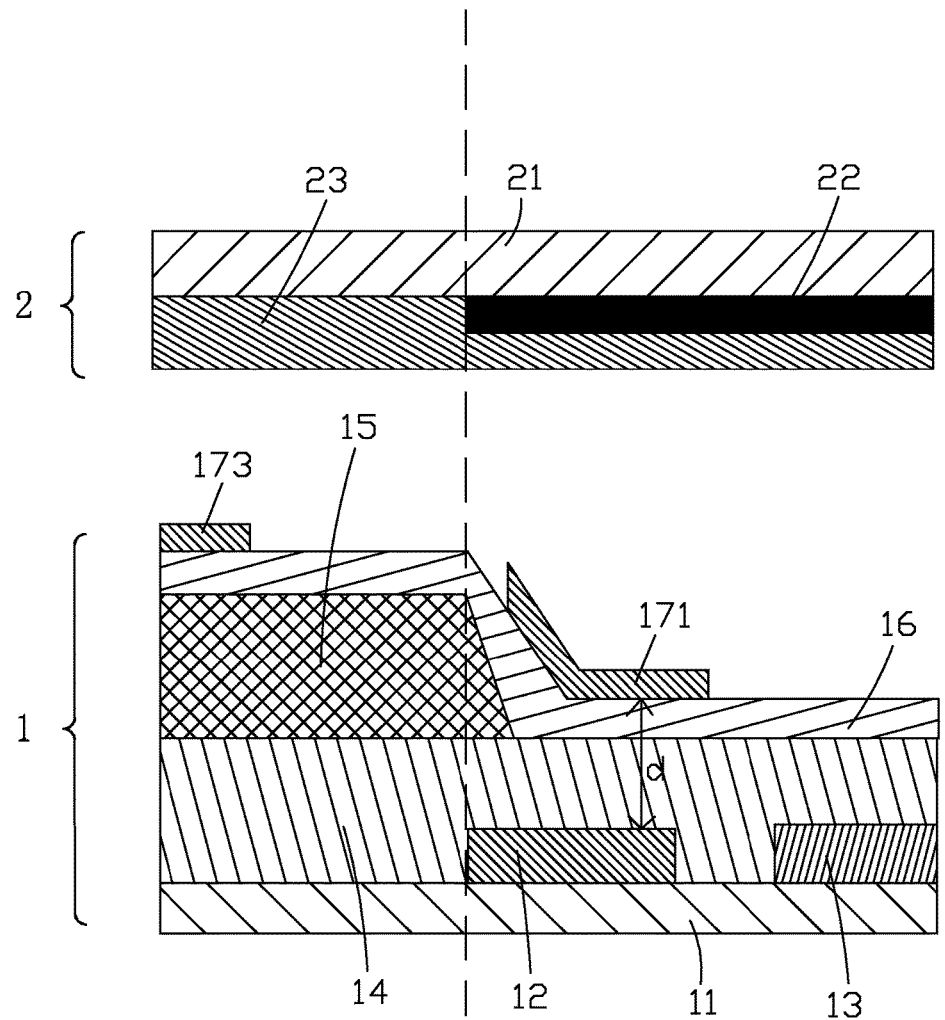
FIG. 4 is a sectional diagram along a sectional line B-B' in FIG. 3 according to a COA type liquid crystal display panel according to the present invention.

Please refer to FIG. 3 and FIG. 4. The present invention provides a COA type liquid crystal display panel, comprising a lower substrate 1, an upper substrate 2 oppositely located to the lower substrate 1 and a liquid crystal layer (not shown) located between the lower substrate 1 and the upper substrate 2;

the lower substrate 1 comprises a plurality of pixel units, and the pixel unit comprises a first substrate 11, a common electrode line 12 and a gate scan line 13 located on the first substrate 11, and an insulation layer 14 located on the common electrode line 12 and the gate scan line 13, a color resist layer 15 located on the insulation layer 14, a passivation layer 16 located on the color resist layer 15 and a pixel electrode 17 located on the passivation layer 16;

the pixel electrode 17 comprises a frame electrode 171 located at peripheric edges of the pixel units, and a storage capacitor Cst is formed between the frame electrode 171 and the common electrode line 12 located below correspondingly thereto;

borders of the color resist layer 15 in respective directions are all located at inner sides of the frame electrode 171 and the common electrode line 12, then no color resist layer 15 is arranged between the frame electrode 171 and the common electrode line 12 to reduce a vertical distance between the frame electrode 171 and the common electrode line 12 and provide the larger storage capacitor Cst.

Specifically, the upper substrate 2 comprises a second substrate 21, a black matrix 22 located on the second substrate 21, a common electrode 23 located on the black matrix 22. The black matrix 22 covers an edge region and of each pixel unit and spaced areas among adjacent pixel units on the lower substrate 1.

Specifically, as shown in FIG. 4, the borders of the color resist layer 15 and borders of the black matrix 22 are aligned. The dimension of the color resist layer 15 is smaller than the size of the entire pixel unit. The color resist layer 15 of the dimension is obtained with a corresponding mask. A slope is formed at the border positions of the color resist layer 15 of the lower substrate 1. However, the slop is in a covering range of the black matrix 22. Thus, there is no influence to the falling down directions of the liquid crystals.

Specifically, the pixel electrode 17 further comprises a main electrode 172 inside the frame electrode 171 and connecting thereto, and a plurality of branch electrodes 173 connected between the main electrode 172 and the frame electrode 171.

The frame electrode 171 is rectangular, and the main electrode 172 is a cross.

Specifically, both the first substrate 11 and the second substrate 12 are glass substrates.

The lower substrate 1 comprises red, green blue pixel units, and materials of color resist layer 15 respectively are red, green, blue resists corresponding to the red, green blue pixel units.

The insulation layer 14 and the passivation layer 16 are a silicon nitride layer, a silicon oxide layer or a compound layer consisted of the silicon nitride layer and the silicon oxide layer.

In comparison with prior art, the present invention reduce the area of the color resist layer in each pixel unit, and borders of the color resist layer in respective directions are all located at inner sides of the frame electrode and the common electrode line, then no color resist layer is arranged between the frame electrode and the common electrode line to reduce a distance between the frame electrode and the common electrode line and ensures the larger storage capacitor.

In conclusion, in the present invention provides a COA type liquid crystal display panel, in each pixel unit of the lower substrate, borders of the color resist layer in respective directions are all located at inner sides of the frame electrode and the common electrode line, then no color resist layer is arranged between the frame electrode and the common electrode line to reduce a vertical distance between the frame electrode and the common electrode line and provide a larger storage capacitor. Accordingly, the display quality of the COA type liquid crystal display panel is promoted.

Above are only specific embodiments of the present invention, the scope of the present invention is not limited to this, and to any persons who are skilled in the art, change or replacement which is easily derived should be covered by the protected scope of the invention. Thus, the protected scope of the invention should go by the subject claims.

What is claimed is:

1. A COA type liquid crystal display panel, comprising a lower substrate, an upper substrate oppositely located to the lower substrate and a liquid crystal layer located between the lower substrate and the upper substrate;
   the lower substrate comprises a plurality of pixel units, and the pixel unit comprises a first substrate, a common electrode line and a gate scan line located on the first substrate, and an insulation layer located on the common electrode line and the gate scan line, a color resist layer located on the insulation layer, a passivation layer located on the color resist layer and a pixel electrode located on the passivation layer;
   the pixel electrode comprises a frame electrode located at peripheric edges of the pixel units, and a storage capacitor is formed between the frame electrode and the common electrode line located below correspondingly thereto;
   borders of the color resist layer in respective directions are all located at inner sides of the frame electrode and the common electrode line, then no color resist layer is arranged between the frame electrode and the common electrode line to reduce a vertical distance between the frame electrode and the common electrode line and provide the larger storage capacitor;
   wherein the upper substrate comprises a second substrate, a black matrix located on the second substrate, a common electrode located on the black matrix, and the black matrix covers an edge region and of each pixel unit and spaced areas among adjacent pixel units on the lower substrate, and the borders of the color resist layer of the lower substrate are aligned with borders of the black matrix of the upper substrate in a vertical direction, and the borders of the color resist layer are formed with slopes at edges and the slopes of the borders of the color resist layer of the lower substrate are in a covering range of the black matrix of the upper substrate in the vertical direction to make no influence to falling down directions of liquid crystals in the liquid crystal layer.

2. The COA type liquid crystal display panel according to claim 1, wherein the pixel electrode further comprises a main electrode inside the frame electrode and connecting thereto, and a plurality of branch electrodes connected between the main electrode and the frame electrode.

3. The COA type liquid crystal display panel according to claim 2, wherein the frame electrode is rectangular, and the main electrode is a cross.

4. The COA type liquid crystal display panel according to claim 1, wherein both the first substrate and the second substrate are glass substrates.

5. The COA type liquid crystal display panel according to claim 1, wherein the lower substrate comprises red, green blue pixel units, and materials of color resist layer respectively are red, green, blue resists corresponding to the red, green blue pixel units.

6. The COA type liquid crystal display panel according to claim 1, wherein the insulation layer and the passivation layer are a silicon nitride layer, a silicon oxide layer or a compound layer consisted of the silicon nitride layer and the silicon oxide layer.

7. A COA type liquid crystal display panel, comprising a lower substrate, an upper substrate oppositely located to the lower substrate and a liquid crystal layer located between the lower substrate and the upper substrate;
   the lower substrate comprises a plurality of pixel units, and the pixel unit comprises a first substrate, a common electrode line and a gate scan line located on the first substrate, and an insulation layer located on the common electrode line and the gate scan line, a color resist layer located on the insulation layer, a passivation layer located on the color resist layer and a pixel electrode located on the passivation layer;
   the pixel electrode comprises a frame electrode located at peripheric edges of the pixel units, and a storage capacitor is formed between the frame electrode and the common electrode line located below correspondingly thereto;
   borders of the color resist layer in respective directions are all located at inner sides of the frame electrode and the common electrode line, then no color resist layer is arranged between the frame electrode and the common electrode line to reduce a vertical distance between the frame electrode and the common electrode line and provide the larger storage capacitor;
   wherein the upper substrate comprises a second substrate, a black matrix located on the second substrate, a common electrode located on the black matrix, and the black matrix covers an edge region and of each pixel unit and spaced areas among adjacent pixel units on the lower substrate, and the borders of the color resist layer of the lower substrate are aligned with borders of the black matrix of the upper substrate in a vertical direction, and the borders of the color resist layer are formed with slopes at edges and the slopes of the borders of the color resist layer of the lower substrate are in a covering range of the black matrix of the upper substrate in the vertical direction to make no influence to falling down directions of liquid crystals in the liquid crystal layer;
   the pixel electrode further comprises a main electrode inside the frame electrode and connecting thereto, and a plurality of branch electrodes connected between the main electrode and the frame electrode;
   wherein the lower substrate comprises red, green blue pixel units, and materials of color resist layer respectively are red, green, blue resists corresponding to the red, green blue pixel units.

8. The COA type liquid crystal display panel according to claim 7, wherein the frame electrode is rectangular, and the main electrode is a cross.

9. The COA type liquid crystal display panel according to claim 7, wherein both the first substrate and the second substrate are glass substrates.

10. The COA type liquid crystal display panel according to claim 7, wherein the insulation layer and the passivation layer are a silicon nitride layer, a silicon oxide layer or a compound layer consisted of the silicon nitride layer and the silicon oxide layer.

* * * * *